US00RE49598E

(19) United States
(12) Reissued Patent
Eisenhour et al.

(10) Patent Number: US RE49,598 E
(45) Date of Reissued Patent: Aug. 8, 2023

(54) VEHICLE HVAC NOISE CONTROL SYSTEM

(71) Applicant: NISSAN MOTOR CO., LTD., Yokohama (JP)

(72) Inventors: Ronald S Eisenhour, West Bloomfield, MI (US); Adrian Tan, Northville, MI (US)

(73) Assignee: Nissan Motor Co., Ltd., Yokohama (JP)

(21) Appl. No.: 16/737,773

(22) Filed: Jan. 8, 2020

Related U.S. Patent Documents

Reissue of:

(64) Patent No.: 9,862,248
Issued: Jan. 9, 2018
Appl. No.: 14/190,710
Filed: Feb. 26, 2014

(51) Int. Cl.
*B60H 1/00* (2006.01)

(52) U.S. Cl.
CPC ..... *B60H 1/00757* (2013.01); *B60H 1/00735* (2013.01); *B60H 1/00821* (2013.01); *B60H 1/00828* (2013.01); *B60H 1/00864* (2013.01); *B60H 1/00985* (2013.01)

(58) Field of Classification Search
CPC ..... B60H 1/00735; B60H 1/00757; B60H 1/00821; B60H 1/00828; B60H 1/00835; B60H 1/00842; B60H 1/00864; B60H 1/00985
See application file for complete search history.

(56) References Cited

U.S. PATENT DOCUMENTS 4,401,852 A * 8/1983 Noso ..... B60R 16/0373 367/198
4,498,309 A * 2/1985 Kobayashi ..... B60H 1/00828 165/43
4,615,357 A * 10/1986 Ito ..... B60H 1/00842 137/596.17

(Continued)

FOREIGN PATENT DOCUMENTS

DE 10027558 A1 12/2001
DE 10119103 A1 * 10/2002 ..... B60J 7/0573

(Continued)

OTHER PUBLICATIONS

English translation of DE-10027558-A1.*

(Continued)

*Primary Examiner* — Peter C English
(74) *Attorney, Agent, or Firm* — Global IP Counselors, LLP

(57) ABSTRACT

A vehicle HVAC noise control system includes an air handler, a blower motor, an audio event device and a controller. The air handler is connected to a passenger compartment. The blower motor is operably connected to the air handler to provide a plurality of airflow rates for air flowing into a passenger compartment. The audio event device produces an audio event to the passenger compartment. The controller is operatively connected to the blower motor and the audio event device. The controller controls operation of the blower motor initially at an operating airflow rate and subsequently switches to a noise reducing airflow rate in response to a signal from the audio event device indicating that the audio event device will subsequently produce the audio event.

12 Claims, 3 Drawing Sheets

(56) References Cited

U.S. PATENT DOCUMENTS 4,819,715 A * 4/1989 Kobayashi ..... B60H 1/00842 165/203
4,899,809 A * 2/1990 Takenaka ..... G05D 23/1393 165/202
5,074,463 A * 12/1991 Suzuki ..... B60H 1/00735 165/42
5,547,125 A * 8/1996 Hennessee ..... B60H 1/00735 236/49.3
5,689,572 A * 11/1997 Ohki ..... G10K 11/1786 381/71.3
5,832,990 A * 11/1998 Eisenhour ..... B60H 1/0075 165/202
5,995,889 A * 11/1999 Eisenhour ..... B60H 1/00735 165/202
6,119,060 A * 9/2000 Takayama ..... B60K 35/00 307/9.1
6,123,267 A * 9/2000 Baker ..... B60H 1/0075 165/204
6,213,198 B1 * 4/2001 Shikata ..... B60H 1/00478 165/202
6,230,795 B1 * 5/2001 Tsunooka ..... B60H 1/00064 165/203
6,782,945 B1 * 8/2004 Eisenhour ..... B60H 1/00064 165/203
8,350,683 B2 1/2013 DeLine et al.
9,428,035 B2 * 8/2016 Eisenhour ..... B60H 1/0075
2004/0200228 A1 * 10/2004 Yanagimachi ..... B60H 1/00742 62/180
2005/0194125 A1 * 9/2005 Asai ..... B60H 1/00864 165/202
2008/0034764 A1 * 2/2008 Iwasaki ..... B60H 1/00735 62/159
2008/0053749 A1 * 3/2008 Utsunomiya ..... G03B 21/16 181/286
2008/0147270 A1 * 6/2008 Sakane ..... B60H 1/00864 701/36
2008/0187147 A1 * 8/2008 Berner ..... F24F 13/24 381/71.3
2009/0126901 A1 * 5/2009 Hegar ..... B60H 1/00371 165/41
2009/0174682 A1 * 7/2009 Bowden ..... B60K 35/00 345/173
2010/0028134 A1 * 2/2010 Slapak ..... F24F 13/24 415/119
2010/0082201 A1 * 4/2010 Pfau ..... B60H 1/00764 701/36
2010/0097239 A1 * 4/2010 Campbell ..... B60R 11/0252 340/4.4
2010/0241308 A1 * 9/2010 Kikuchi ..... B60H 1/00278 701/36
2011/0010015 A1 * 1/2011 Jordan ..... B60H 1/00735 700/280
2011/0120146 A1 * 5/2011 Ota ..... B60H 1/00885 62/3.3
2011/0146320 A1 * 6/2011 Tomiyama ..... B60H 1/3208 62/296
2011/0308883 A1 * 12/2011 Eaton ..... F24F 7/065 181/224
2012/0102974 A1 * 5/2012 Kawazoe ..... B60H 1/00035 62/3.61
2013/0131886 A1 * 5/2013 Nitta ..... G06F 1/206 700/300
2014/0045417 A1 * 2/2014 Sakamoto ..... B60H 1/00028 454/143
2015/0224848 A1 * 8/2015 Eisenhour ..... B60H 1/0075 62/186

FOREIGN PATENT DOCUMENTS

DE 102005033353 A1 * 1/2007 ..... B60H 1/00828
GB 2344646 A * 6/2000 ..... B60H 1/00507
JP S64-9016 A 1/1989
JP H04-208626 A 7/1992
JP H07-41794 B2 5/1995
JP 2004509796 A 4/2004
KR 20070034792 A * 3/2007
WO WO-03055707 A1 * 7/2003 ..... B60H 1/00742

OTHER PUBLICATIONS

English translation of DE-10119103-A1.*
English translation of DE-102005033353-A1.*
English translation of JP-H04-208626-A.*
English translation of JP-H07-41794-B2 and JP-S64-9016-A.*
English translation of KR-20070034792-A.*

* cited by examiner

VEHICLE HVAC NOISE CONTROL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 9,862,248, issued Jan. 9, 2018, from U.S. patent application Ser. No. 14/190,710.*

BACKGROUND

Field of the Invention

The present invention generally relates to a vehicle HVAC noise control system. More specifically, the present invention relates to an HVAC noise control system that automatically reduces an airflow rate produced by a blower of an HVAC system prior to an occurrence of an audio event.

Background Information

Many vehicles include audio devices such as, for example, a wireless telephone system and/or a navigation device. These devices produce audio outputs within the passenger compartment of the vehicle. When an HVAC system (heating, ventilation and air conditioning system) of the vehicle is set to provide a large airflow rate into the passenger compartment for cooling or heating purposes, the noise level generated by the air flowing into the passenger compartment can make it difficult for the vehicle operator and/or passengers to hear the audio output of the audio devices.

SUMMARY

One object of the present disclosure is to provide a vehicle with an HVAC system controller that anticipates occurrence of an upcoming audio event within the passenger compartment and lowers the airflow rate of the air flowing into the passenger compartment, in anticipation of the audio event, thereby reducing the noise level produced by the air flowing into the passenger compartment.

In view of the state of the known technology, one aspect of the disclosure is a vehicle HVAC noise control system that includes an air handler, a blower motor, an audio event device and a controller. The air handler is connected to a passenger compartment. The blower motor is operably connected to the air handler to provide a plurality of airflow rates for air flowing into a passenger compartment. The audio event device produces an audio event to the passenger compartment. The controller is operatively connected to the blower motor and the audio event device. The controller controls the operation of the blower motor initially at an operating airflow rate and subsequently switches to a noise reducing airflow rate in response to a signal from the audio event device indicating that the audio event device will subsequently produce the audio event.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
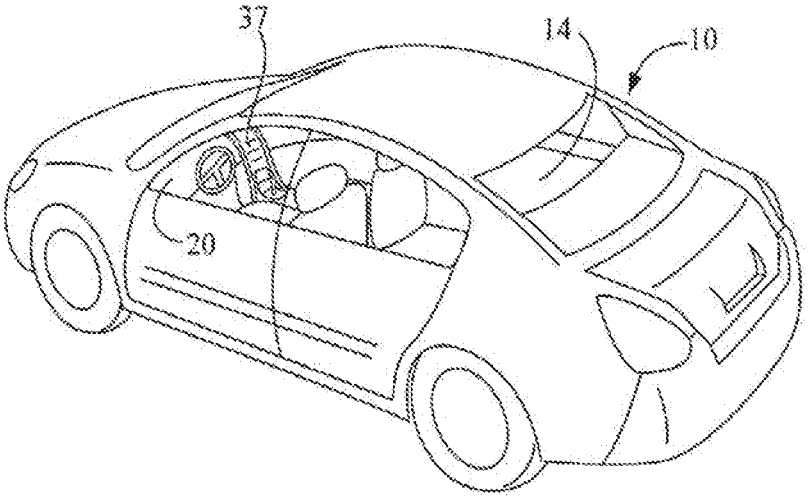
FIG. 1 is a perspective view of a vehicle that includes an HVAC noise control system in accordance with one embodiment.
Figure 2:
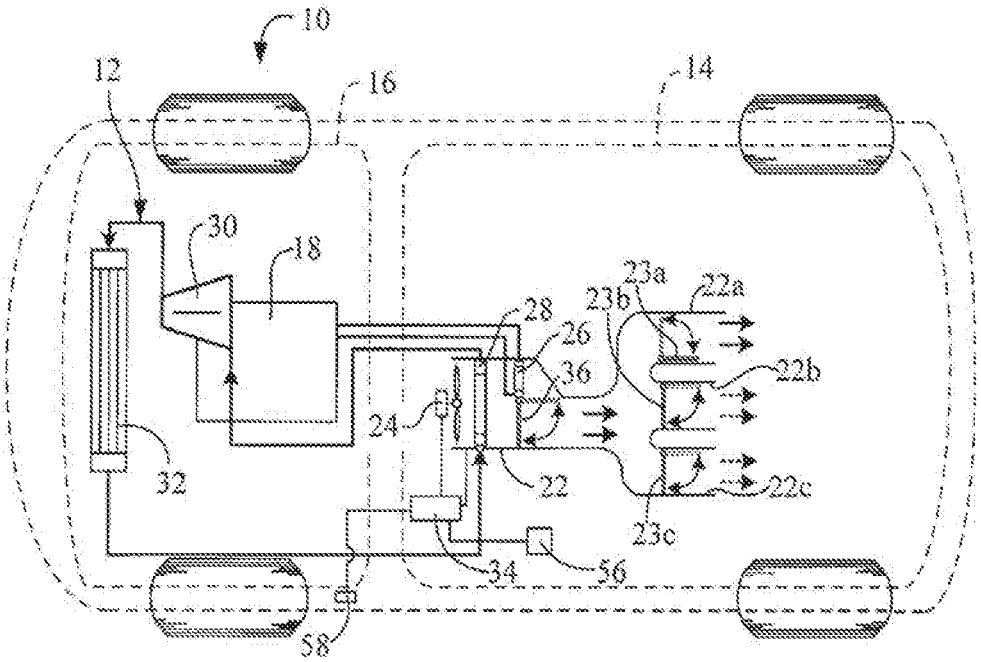
FIG. 2 is a schematic view of the vehicle showing details of the HVAC noise control system in accordance with the one embodiment.
Figure 3:
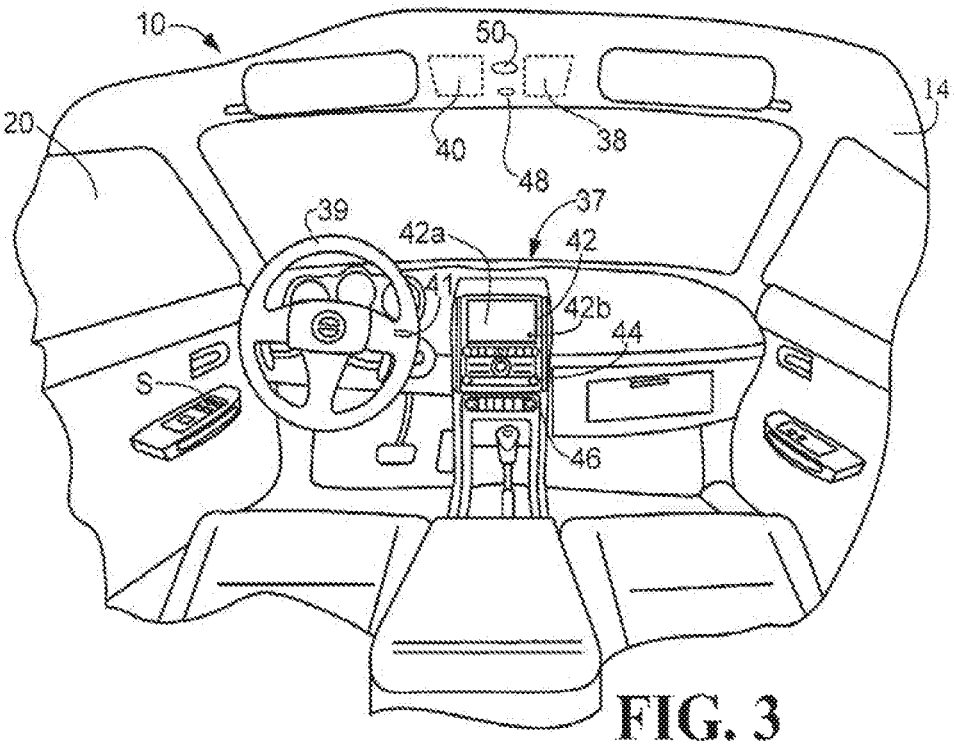
FIG. 3 is a plan view of portion of the vehicle showing a passenger compartment and a plurality of audio event devices in accordance with the one embodiment.

Referring initially to FIG. 1, a vehicle 10 is illustrated in accordance with a first embodiment. As shown in FIGS. 1-3, the vehicle 10 includes, among other things, an HVAC system 12, a passenger compartment 14, an engine compartment 16, a propulsion system 18 and a movable window panel 20. The HVAC system 12 includes a noise reducing feature that reduces the airflow rate of air flowing to the passenger compartment 14 in anticipation of various audio events, as described in greater detail below.

The HVAC system 12 includes an air handler 22, a blower 24, a heat source 26, an evaporator 28, a compressor 30, a condenser 32 and a controller 34. The blower 24, the heat source 26 and the evaporator 28 are all located within or adjacent to the air handler 22. The air handler 22 includes a mixing door 36 that is electronically positioned by the controller 34 to any one of a plurality of positions in order to control the temperature of air flowing out of the air handler 22 and into the passenger compartment 14. For example, in FIG. 2, the mixing door 36 is shown in solid lines in a heating mode where all of the air flowing through the air handler 22 is passed over heating surfaces of the heat source 26 in order to heat the air flowing into the passenger compartment 14. In FIG. 2, the mixing door 36 is shown in phantom lines in a cooling mode where all of the air flowing through the air handler 22 is prevented from flowing past the heat source 26 and only passes over cooling surfaces of the evaporator 28. The evaporator 28 is selectively operated to extract heat from the air flowing through the air handler 22. In the depicted embodiment, the air flowing through the air handler 22 always passes over heat exchanging surfaces of the evaporator 28.

The air handler 22 also includes a plurality of air outlets, such as air outlets 22a, 22b and 22c. It should be understood from the drawings and the description herein that the air handler 22 can include many air outlets. For purposes of explaining the operation of the controller 34, only three such air outlets are depicted in FIG. 2 and described hereinbelow. However, there can be 4,6, 8 or more air outlets directing air from the air handler 22 to the passenger compartment 14. In the depicted embodiment, the air outlet 22a represents all air outlets directing air to a windshield of the vehicle 10, for example, as used in a defrost or defog operation. The air outlet 22b represents all air outlets that are provided in an instrument panel 37, directing air to flow on the vehicle operator and/or passenger(s). The air outlet 22c represents all air outlets that direct air to flow toward the floor of the passenger compartment 14 and can also include any air outlets that direct air to flow to a rearward portion of the passenger compartment 14.

Each of the air outlets 22a, 22b and 22c includes a corresponding door 23a, 23b and 23c that are connected to the controller 34 such that each of the doors 23a, 23b and 23c can be moved between an open position and a closed position. Specifically, with the door 23a in an open position, air flows through the air outlet 22a. With the door 23a in a closed position, air does not flow through the air outlet 22a. With the door 23b in an open position, air flows through the air outlet 22b. With the door 23b in a closed position, air does not flow through the air outlet 22b. With the door 23c in an open position, air flows through the air outlet 22c. With the door 23c in a closed position, air does not flow through the air outlet 22c.

The blower 24 pushes air through the air handler 22 into the passenger compartment 14. The blower 24 is operated and controlled by the controller 34 and/or settings made by the vehicle operator and/or passengers, in order to provide a plurality of differing airflow rates of the air flowing into the passenger compartment 14.

The heat source 26 can be provided with heated engine coolant from the propulsion system 18 or can be an electric heater. The engine compartment 16 includes the propulsion system 18 and various compartments of the HVAC system 12, such as the compressor 30 and the condenser 32. The evaporator 28, the compressor 30 and the condenser 32 are conventional elements of an HVAC system. Therefore, further description of the evaporator 28, the compressor 30 and the condenser 32 is omitted for the sake of brevity.

A description of the controller 34 is provided below, after further description of various features of the vehicle 10.

As shown in FIG. 3, the passenger compartment 14 includes the instrument panel 37, a hands-free communication device 38 and a voice recognition device 40. The instrument panel 37 includes a navigation device 42, a climate control panel 44 and an audio controller 46. In FIG. 3, the hands-free communication device 38 and the voice recognition device 40 are depicted as being concealed by a headliner of adjacent to the roof of the vehicle 10. However, it should be understood from the drawings and the description herein that the hands-free communication device 38 and the voice recognition device 40 can be located within the instrument panel 37, within the engine compartment 16, or any convenient location within the passenger compartment 14.

The hands-free communication device 38 and the voice recognition device 40 are connected to a microphone 48 and an audio speaker 50 such that commands spoken by the vehicle operator and/or passenger are detected by the hands-free communication device 38 and the voice recognition device 40 via the microphone 48. When the hands-free communication device 38 and/or the voice recognition device 40 outputs an audio output (an audio event), such as a caller's voice from a telephone call, the audio output is sent to the audio speaker 50. It should be understood from the drawings and the description herein that the audio speaker 50 can alternatively be part of the music/entertainment system (not shown) of the vehicle 10. More specifically, the audio controller 46 typically controls audio output of the music/entertainment system from, for example, broadcast radio, satellite radio, CD, player and/or MP3 player. The music/entertainment system (not shown) includes a plurality of speakers (not shown) located at various positions within the passenger compartment 14. The audio speaker 50 shown in FIG. 3 can be a separate stand-alone speaker or, alternatively, the audio speaker 50 can be one or all of the audio speakers of the music/entertainment system. Further, the hands-free communication device 38 and the voice recognition device 40 can be directly coupled to the music/entertainment system such that the hands-free communication device 38 and the voice recognition device 40 output audio via the speakers of the music/entertainment system.

The hands-free communication device 38 is a device that communicates with mobile devices such as a cell phone, using, for example, BlueTooth® technology. Thus, the hands-free communication device 38 is programmed to link to a vehicle operator's mobile communication device, such as a cell phone, such that the vehicle operator and/or passenger can make telephone calls, receive telephone calls, or engage in other forms of communication tasks, such as text-to-speech readouts of SMS (short message services), without using his/her hands in a conventional manner.

Further, as is described in greater detail below, when the mobile device (i.e., cell phone) receives an incoming telephone call or incoming text message, the hands-free communication device 38 provides a signal to the controller 34 to switch operation of the blower 24 to a noise reducing airflow rate, as described further below. The controller 34 then lowers the airflow rate produced by the blower 24. Thereafter, the hands-free communication device 38 produces an indication of the incoming telephone call via the audio speaker 50. Hence, the user is able to answer the telephone call and have a telephone conversation with the noise level produced by the airflow rate of the blower 24 being reduced. Upon answering, the user can hear the caller through the audio speaker 50 or through the onboard audio speaker system, and produce an audible response received by the microphone 48. The indication of the incoming telephone call, and subsequent conversation, are audio events, as discussed further below. Hence, the audio event produced by the hands-free telephone system includes the telephone interaction (speakers and microphone) and can also include the indication of the incoming phone call or other incoming communication.

The voice recognition device 40 is a system that, for example, responds to specific audible input such as voice commands from the vehicle operator's voice or the voice of a passenger. Such voice commands can be, for example: a request for specific music or other audio output from the vehicle music/entertainment system; a request to make a phone call to a specific individual or phone number; a request to input navigation information; and/or a request to engage cruise control.

The voice recognition device 40 is typically initiated or activated by a voice command from the vehicle operator or passenger. However, the voice recognition device 40 can also be activated by a manual control initiation input (such as a mechanical switch 41 on the instrument panel 37 or steering wheel 39). However, the voice recognition device 40 may always be in a standing-by mode or a listening mode, waiting for a specific audible initiation input from the vehicle operator or passenger. Once the specific audible initiation input is detected by the microphone 48 or the switch 41, the voice recognition device 40 can produce an audible acknowledgement of the initiation input, indicating operating in a listening mode. Thereafter, the voice recognition device 40 interprets the audible command and performs a function corresponding to the audible command.

Hence, the voice recognition device 40 produces audio events, as used by the controller 34 and described in greater detail below. For example, an audio event produced by voice recognition device 40 can include at least the listening mode, but further can include an initiation acknowledgement, and a performance of the function corresponding to the audible command. Since voice recognition systems are conventional, further description is omitted for the sake of brevity.

The navigation device 42 is, for example, a global positioning system (GPS) that provides mapping, positioning and driving directions for the vehicle operator. The navigation device 42 can also be part of an intelligent transportation system (ITS) that provides warning messages relating to road or weather conditions relating to driving. The navigation system 42 typically includes a visual display 42a on the instrument panel 37 and also provide an audio output (an audio event) such that the vehicle operator is provided with driving instructions without taking eyes from the road ahead. The visual display 42a can be a dedicated display used only by the navigation device 42 to display, for example, maps. Alternatively, the visual display 42a can be connected to the climate control panel 44 to display data and information related to the settings of the HVAC system 12. Further the visual display 42a can also be connected to the music/entertainment system to display information such as radio station settings or music selection information.

The navigation device 42 can be connected to the voice recognition device 40 such that voice commands processed by the voice recognition device 40 can be used to set and adjust destination information used by the navigation device 42. The navigation device 42 is also connected to the audio speaker 50 or onboard audio speaker system such that the audio speaker 50 outputs audio from the navigation device 42, such as driving instructions, request for information, or other navigation related output. All of the audio outputs of the navigation system 42 are audio events.

The climate control panel 44 on the instrument panel 37 is an inputting device that the vehicle operator and/or passenger uses to set HVAC system parameters, such as a desired cabin temperature for the passenger compartment 14, a manual setting for an airflow rate produced by the blower 24, defrost and defog settings, an automatic temperature control setting, and other settings for the HVAC system 12 of the vehicle 10.

The movable window panel 20 (herein after window 20) is a conventional vehicle window that is located in the structure of a door of the vehicle 10. The window 20 can be a mechanically operated window or can be part of an electric window system that raises and lowers the window 20 between a fully closed orientation, a fully open orientation and any member of partially open orientations by an electric motor (not shown) and operated by a switch S on the side front door, as shown in FIG. 3. The switch S can provide a signal to the controller 34 to indicate anticipation of an audio event involving the window 20. The window 20 may also include a window sensor 52 (FIG. 4) that detects whether or not the window 20 is open or not. When the window 20 moves to an open position, the window sensor 52 provides a signal to the controller 34 indicating that the window 20 is open (not in the closed position). The vehicle 10 also includes a speed sensor 54 that detects the speed of the vehicle 10. The logic of the controller 34 assumes that when the window 20 is in an open position or partially open and the speed of the vehicle 10 is close to zero (approximately zero or less than five miles per hour), an audio event is about to occur or is occurring, such as a discussion with a bank teller, a discussion with a person at a take-out window, or the like.

It should be understood that the controller 34 and the window sensor 52 can be configured in any of a variety of ways. Specifically, the window sensor 52 can be configured to detect each and every position the window 20 is moved to. Alternatively, the window sensor 52 can be configured to detect only the fully open orientation and the fully closed orientation. The controller 34 can be configured to operate in a noise reduction mode in response to the window 20 being in the fully open orientation. Alternatively, the controller 34 can be configured to operate in the noise reduction mode in response to the window being only partially open, and not in the fully closed orientation.

As used hereinbelow, the term "audio event" refers to two types of actions. For example, an action taken either by the vehicle operator or passenger that involves a sound or spoken word, for instance, a command spoken out loud, so that it can be picked up by the microphone 48 and processed by the voice recognition device 40, is one type of "audio event". Another type of "audio event" is one where a device within the vehicle 10 produces an audio output that is intended to assist the vehicle operator or passenger in some way. For example, an incoming telephone call received by a cell phone connected via wireless communication to the hands-free communication device 38 constitutes an audio event. The activation or initiation of the voice recognition device 40 constitutes an audio event. The issuance of driving directions from the navigation device 42 constitutes an audio event. The window 20 being open constitutes an audio event in that when the window 20 is open, it is assumed that an occupant of the vehicle 10 intends to interact with an entity external to the passenger compartment 14. For instance, the vehicle 10 is currently at, for example, a drive-up teller's window of a bank, a toll booth to seek information or pay a toll, or a fast-food window for the purpose of ordering a beverage or food.

Thus, each of the following devices is an audio event device: the hands-free communication device 38; the voice recognition device 40; the navigation device 42; and the window 20.

The controller 34 of the HVAC system 12 controls numerous operations and operating modes of the HVAC system 12. Specifically, the controller 34 includes programming instructions that allow it to control the HVAC system 12 in some or all of, for example, a manual mode, an automatic mode and a noise reduction mode. In the manual mode only the settings inputted by the vehicle operator or passenger using the climate control panel 44 are used by the controller 34 to set the position of the mixing door 36, operate the compressor 30 and set the blower 24 to produce a set airflow rate. Specifically, if the climate control panel 44 is set manually to produce heat with the blower 24 set to a specific speed, then the controller 34 sets the mixing door 36 to a corresponding position and operates the compressor 30 to operate if cooling or defog is manually set.

If the automatic mode is engaged at the climate control panel 44, then the controller 34 automatically determines an optimal setting for the mixing door 36 to provide heating and/or cooling of the air flowing through the air handler 22, and operates the blower 24 to provide an appropriate airflow rate. For example, if a temperature sensor 56 within the passenger compartment 14 provides a temperature reading that differs by more than a couple of degrees from the desired cabin temperature set using the climate control panel 44, the controller 34 sets the mixing door 36 to provide an appropriate change (heating or cooling) to the temperature of the air flowing through the air handler 22 and sets the blower 24 to produce a large airflow rate of the air flowing from the air handler 22 into the passenger compartment 14. As the difference between the desired cabin temperature and the cabin temperature measured by the temperature sensor 56 within the passenger compartment 14 diminishes and approaches zero, the controller 34 can reduce the airflow rate by slowing the speed of the blower 24 and reducing the temperature changing capability of the air handler 22 by repositioning the mixing door 36.

Examples of operation in an automatic mode are set forth in, for instance, U.S. Pat. Nos. 5,832,990, 5,995,889 and 6,782,945, all commonly assigned and having common inventorship. U.S. Pat. Nos. 5,832,990, 5,995,889 and 6,782,945, are all incorporated herein by reference in their entirety.

The noise reduction mode of the controller 34 can be integrated into the automatic mode described above, or can be a separate mode that is activated by a mechanical switch of the climate control panel 44. In the depicted embodiment, the noise reduction mode of the controller 34 is part of the overall logic of the automatic mode described above. In other words, the noise reduction mode described herein can be added to any of the various the automatic modes referred to above with respect to U.S. Pat. Nos. 5,832,990, 5,995,889 and 6,782,945, or can be added to other similar automatic modes of operation of an HVAC system. The noise reduction mode of the controller 34 is now described with specific reference to FIGS. 4 and 5.

Figure 4:
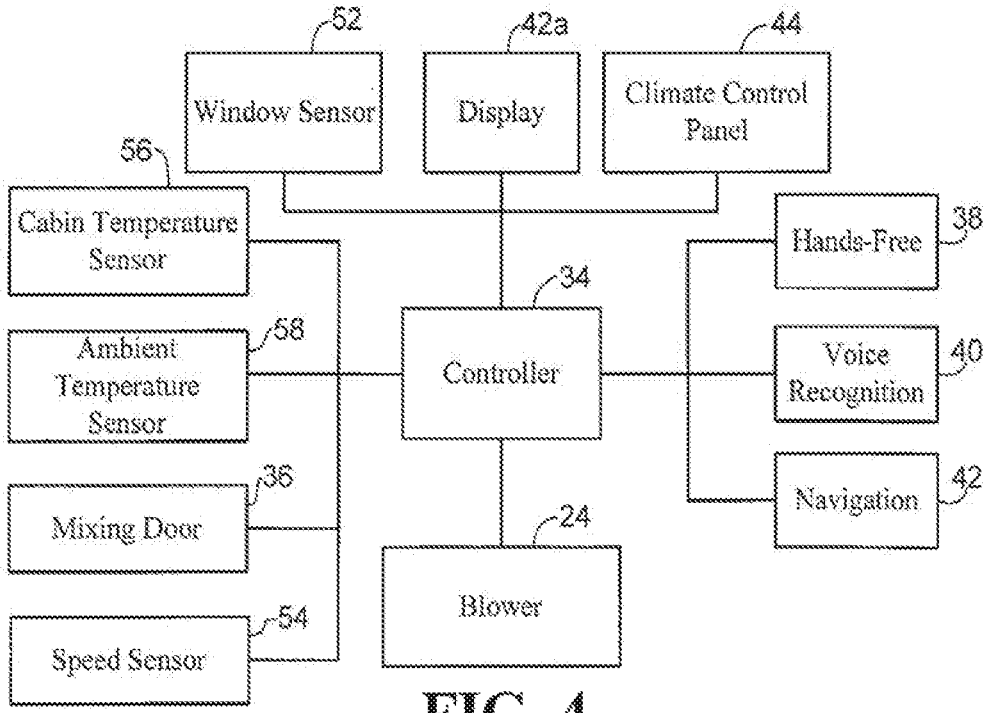
FIG. 4 is a block diagram of the HVAC noise control system showing a controller connected to a blower and the plurality of audio event devices in accordance with the one embodiment.

As shown in FIG. 4, the controller 34 is operably connected to the blower 24 in a conventional manner to the mixing door 36, the hands-free communication device 38, the voice recognition device 40, the navigation device 42, the display 42a, the window sensor 52, the temperature sensor 56 and an ambient temperature sensor 58. As used herein, the term operably connected can mean a direct electrical wire connection or can be a wireless connection. The controller 34 receives signals from each of the devices it is connected to such that the controller 34 can respond accordingly to each of the received signals. Specifically, the controller 34 sends and receives speed related signals to and from the blower 24 in order to control airflow rates into the passenger compartment 14 produced by the blower 24. The controller 34 sends and receives position related signals to and from the mixing door 36 such that the controller 34 can reposition the mixing door 36, if changes to the position of the mixing door 36 are necessary. The controller 34 receives signals from the hands-free communication device 38 indicating the status of the hands-free communication device 38, and in particular, the controller 34 receives a signal from the hand-free communication device 38 indicating a telephone call is about to be received from a connected cell phone. The controller 34 also receives signals from the voice recognition device 40 indicating the operational status of the voice recognition device 40. The controller 34 also receives signals from the navigation device 42 indicating the operational status of the navigation device 42. The controller 34 is also connected to the display 42a such that status information relating to the HVAC system 12 and operations of the controller 34 can be displayed on the display 42a. The controller 34 receives signals from the window sensor 52 indicating whether or not the window 20 is open or not. Finally, the controller 34 is connected to the temperature sensor 56 indicating the cabin temperature within the passenger compartment 14 and is connected to an ambient temperature sensor 58 indicating the ambient temperature outside the vehicle 10.

Figure 5:
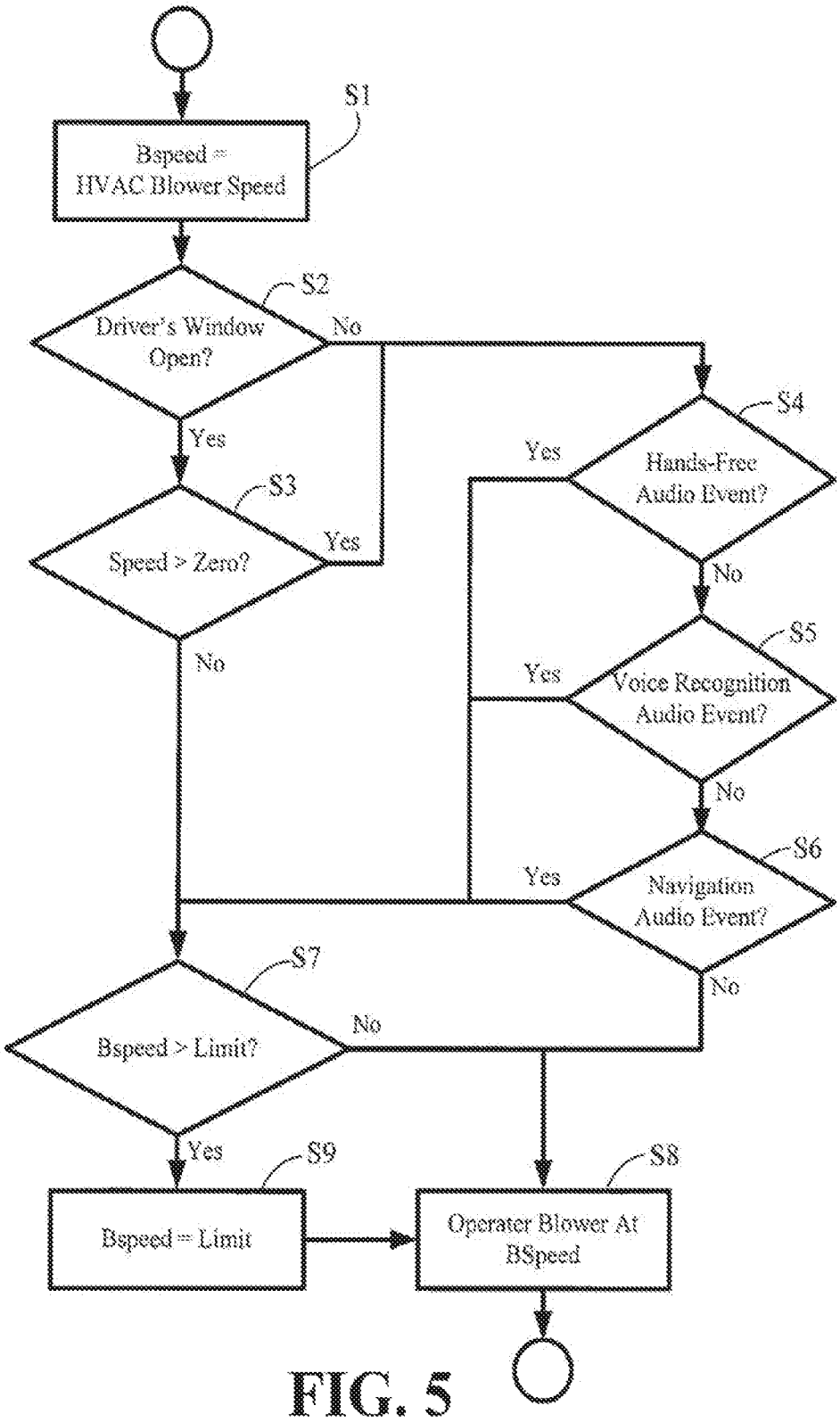
FIG. 5 is a flowchart showing an example of operation performed by the controller of the HVAC control system in accordance with the one embodiment.

One example of the operational steps controlled by the controller 34 when operating in the noise reduction mode is shown in FIG. 5. Specifically, at step S1, the controller 34 defines a variable BSpeed as being equal to a variable HVAC blower speed, which is defined in any of a variety of ways. Specifically, the variable HVAC blower speed can be determined by the controller 34 in the automatic mode. In the automatic mode, the controller 34 determines whether or not temperature changes are necessary by detecting the current temperature of the passenger compartment 14 via signals from the temperature sensor 56 within the passenger compartment 14, and comparing the temperature within the passenger compartment 14 with a desired cabin temperature set using at the climate control panel 44. If the difference between the desired cabin temperature and the current temperature of the passenger compartment 14 is greater than a predetermined amount in the automatic mode, the mixing door 36 is set to an appropriate position and the blower 24 is set to produce an appropriate airflow rate that corresponds to the variable HVAC blower speed. The controller 34 further evaluates the ambient temperature outside the vehicle 10 as measured by the ambient temperature sensor 58. Specifically, on a very hot day in the automatic mode, the outlet temperature of air flowing from the air handler 22 into the passenger compartment 14 can be made lower to meet cooling demands based on the ambient temperature. On a very cold day in the automatic mode, the outlet temperature of air flowing from the air handler 22 into the passenger compartment 14 can be made higher to meet heating demands based on the ambient temperature.

Alternatively, the variable HVAC blower speed can be the current speed of the blower 24 as initially manually set by the vehicle operator or passenger using the climate control panel 44.

At step S2, the controller 34 determines whether or not the movable window panel 20 is open or not based on the output of the window sensor 52 or whether or not the window is in a open orientation based upon activation of the switch S. If the window is not open, it is likely the window is partially open for ventilation purposes only or is shut and operation moves to step S4. If the window is determined to be open at step S2, the controller 34 concludes that the vehicle operator may be about to engage in a conversation with another entity outside the vehicle 10 and operation moves in step S3 in anticipation of an audio event. At step S3, the controller 34 accesses the measurements of the speed sensor 54. If the speed of the vehicle 10 is greater than approximately zero, then the vehicle is in motion and operation moves to step S4. If the speed of the vehicle 10 is not greater than approximately zero, then the vehicle 10 is assumed to be at a stop and with the window being open, an audio event is likely about to occur. Operation then moves to step S7, as described in greater detail below.

At Step S4, the controller 34 determines whether or not the hands-free communication device 38 has sent an activation signal corresponding to initiation of a phone call or the receiving of an incoming phone call in anticipation of an audio event. If, at step S4 the hands-free communication device 38 has sent an activation signal corresponding to either the initiation of a communication activity or the receiving of an incoming communication, operation moves to step S7. As mentioned above, the hands-free communication device 38 can send a signal to the controller 34 at a time interval prior to performing a hands-free interaction, such as providing a ringing sound indicating an incoming phone call. This section anticipates an audio event. Specifically, this action anticipates an upcoming telephone conversation. If no activation signal has been received at step S4, operation then moves to step S5.

At step S5, the controller 34 determines whether or not the voice recognition device 40 has sent an activation signal to the controller 34 in anticipation of an audio event. If, at step S5 the voice recognition device 40 has sent an activation signal to the controller 34, operation moves to step S7. Upon receiving a signal indicating manual activation via the switch 41 or receiving an input from the microphone 48, the voice recognition system 40 sends the signal to the controller 34 at a time interval prior to performing a voice recognition interaction. If no activation signal has been received at step S5, operation then moves to step S6.

At Step S6, the controller 34 determines whether or not the navigation device 42 has sent an activation signal to the controller 34 in anticipation of an audio event. If at step S6 the navigation device 42 has sent an activation signal to the controller 34, the controller 34 assumes the navigation device 42 is about to initiate an audio event, such as provide driving directions to the vehicle operator and operation moves to step S7. If the navigation device 42 has not sent an activation signal to the controller 34 at step S6, operation moves to step S8.

At step S7, the controller 34 determines whether or not the variable BSpeed is greater than a predetermined variable Limit. The predetermined variable Limit corresponds to a speed of the blower 24 with a low noise level, determined to be sufficiently low so as not to interfere with the anticipated audio events. If at step S7 the variable BSpeed is greater than the predetermined variable Limit, then operation moves to step S9. If at step S7 the variable BSpeed is not greater than the predetermined variable Limit, then operation moves to step S8.

At step S9, the variable BSpeed is made equal to the predetermined variable Limit. At step S8, the blower 24 is set by the controller 34 to operate at a speed corresponding to the variable BSpeed and thereby producing a corresponding airflow rate of air flowing from the air handler 22 to the passenger compartment 14. Coupled with steps S8 and S9 is a timer of the controller 34 that maintains the blower 24 at the speed BSpeed for a predetermined period of time when B Speed has been redefined in step S9 as the Limit. The predetermined period of time of the timer of the controller 34 is provided to ensure that the anticipated audio event has time to occur before BSpeed is redefined again in a next iteration of the logic in FIG. 5. In other words, when steps S9 and S8 are both implemented, the timer prevents the controller 34 from proceeding to a next iteration of the logic in FIG. 5 for a brief period of time.

For example, when, at steps S2 and S3, the controller 34 determines that the window 20 has been opened and the speed is close to zero, the controller 34 anticipates an audio event and the lowered airflow rate Limit (BSpeed) is maintained for the predetermined period of time before the controller 34 cycles through the logic steps S1-S9 again. Similarly, if any one of the steps S4, S5 and/or S6 has triggered anticipation of an audio event, the controller 34 waits at step S8 for the predetermined period of time before cycles through the logic steps S1-S9 again. The predetermined period of time can be anywhere from five seconds to twenty-five seconds, depending upon the design of the vehicle 10 and the HVAC system 12, or the variable operator preferences.

Each of the audio event devices (the window 20, the hands-free communication device 38, the voice recognition device 40 and the navigation device 42) coordinate with the controller 34 such that each audio event device sends its corresponding signal to the controller 34 at a time interval just before or prior to producing an audio event (an audible output) thereby anticipating an upcoming audio event. In the case of the window 20 being open, as soon as the controller 34 receives the signal from the window sensor 52 that the window is open and the controller 34 determines the vehicle speed is close to zero, the controller 34 immediately defines the variable BSpeed as being equal to the predetermined variable Limit, and the speed of the blower 24 is reduced so that the audio event (a conversation through the window opening) can commence without interference from a large noise level produced by the air flowing from the air handler 22 into the passenger compartment 14.

The controller 34 repeatedly and continuously cycles through the logic set forth in FIG. 5, while the vehicle 10 and the HVAC system 12 are in operation. Hence, at the conclusion of each and every audio event, the logic set forth in FIG. 5, returns the speed of the blower 24 to automatic control such that a level corresponding to one determined by the logic of the automatic mode or the variable HVAC blower speed, as defined prior to the audio event. The resumption of the airflow rate to a level determined by the automatic mode logic occurs after a predetermined time interval that can be programmed into the controller 34 or can be a result of the cycling time through iterations of the steps S2-S9 depicted in the flowchart in FIG. 5.

Further, although not shown in FIG. 5, during any of the audio events described above, the controller 34 can also re-position the mixing door 36 to increase or decrease the outlet temperature of air flowing from the air handler 22 at step S9, while simultaneously defining the variable B Speed as being equal to the predetermined variable Limit. More specifically, if the controller 34 is currently operating the HVAC system 12 in a cooling operation and an audio event is anticipated, at step S9 the controller 34 can reposition the mixing door 36 and operate the compressor 30 and evaporator 28 to further reduce the outlet temperature of air flowing from the air handler 22 to the passenger compartment 14 while reducing the speed of the blower 24 (and reducing the airflow rate). Further, if the controller 34 is currently operating the HVAC system 12 in a heating operation and an audio event is initiated, at step S9 the controller 34 can reposition the mixing door 36 to further increase the outlet temperature of air flowing from the air handler 22 to the passenger compartment 14 while lowering the speed of the blower 24 (and reducing the airflow rate).

Although not shown in FIG. 5, while the controller 34 is controlling the blower 24 to operate at the noise reducing airflow rate (corresponding to the variable Limit), the controller 34 can further control the display 42a to produce an indication 42b (FIG. 3) then the blower 24 is being operated at the noise reducing airflow rate.

As mentioned above, a plurality of air outlets are connected to the air handler 22 directing airflow into the passenger compartment 14. Some of these air outlets can direct air toward the microphone 48. The controller 34 is further connected the air handler 22 to open and close each of these air outlets as required. More specifically, the controller 34 can open and close groups of these air outlets to direct air to flow from the air handler 22 toward the windshield in the defog or defrost mode. In a cooling operation, the controller 34 can close the door 23a to prevent air from flowing to the windshield through the air duct 22a.

The controller 34 opens the doors 23b and 23c so that air can flow from the air handler 22 through the air outlets 22b and 22c thereby directing air to flow from the air handler 22 toward the vehicle operator and/or passenger. In a heating operation, the controller 34 can close the doors 23a and 23b, open door 23c such that air only flows from the air handler 22 toward the floor of the passenger compartment 14. It should be understood from the description herein and drawings that other combination of opening and closings of the doors 23a, 23b and 23c are possible.

In the noise reduction mode where the blower 24 is operated at the noise reducing airflow rate (corresponding to the variable Limit), the controller 34 can open and close groups of these air outlets to prevent air from flowing from the air handler 22 toward the microphone 48. For example, if as shown in FIG. 3 the microphone 48 is installed to the roof of the passenger compartment 14, the controller 34 can close the door 23a and prevent air from flowing upward along the windshield toward the microphone 48, thereby preventing the airflow from interfering with the operation of the microphone 48.

As described above, the controller 34 operates the blower 24, the mixing door 36 and the air outlet doors 23a, 23b and 23c in order to facilitate audio events. The controller 34 further controls the speed of the blower 24 to produce an airflow rate that produces a reduced noise level in anticipation of an audio event thereby improving the conditions within the passenger compartment 14 while the vehicle operator or passenger is engaged during the upcoming audio event.

Although not shown, the vehicle 10 can also optionally include a passenger detection sensor or a plurality of passenger detection sensors, one for each seat within the vehicle 10, connected to the controller 34. If the vehicle 10 is operating, the controller 34 assumes there is a vehicle operator in the vehicle 10. The controller 34 can further be configured to determine whether or not a passenger is present within the vehicle 10 in addition to the vehicle operator, via signals from the passenger detection sensor(s). If a passenger is present within the vehicle 10, the controller 34 is configured to re-position the doors 23a, 23b and 23c in order to divert airflow away from the passenger, in particular if the audio event is a telephone call that requires audio contributions by the passenger. If no passenger is present, the controller 34 can re-position the doors 23a, 23b and 23c in order to divert airflow away from the vehicle operator. Airflow directed onto the vehicle operator or the passenger during an audio event, such as a telephone call, could interfere with the success of the audio event.

The controller 34 preferably includes a microcomputer with a HVAC system control program that controls various elements of the HVAC system 12, such as the compressor 30, the mixing door 36 and the blower 24, as discussed herein. The controller 34 can also include other conventional components such as an input interface circuit, an output interface circuit, and storage devices such as a ROM (Read Only Memory) device and a RAM (Random Access Memory) device. The microcomputer of the controller 34 is programmed to control the HVAC system. The memory circuit stores processing results and control programs such as ones for HVAC system operation that are run by the processor circuit. The controller 34 is operatively coupled to the components of the HVAC system 12 in a conventional manner. The internal RAM of the controller 34 stores statuses of operational flags and various control data. The internal ROM of the controller 34 stores the commands and operating instructions for various HVAC system operations. It will be apparent to those skilled in the art from this disclosure that the precise structure and algorithms for the controller 34 can be any combination of hardware and software that will carry out the functions of the present invention.

The various components and features of the vehicle 10 that are not necessarily described herein are conventional components that are well known in the art. Since these components and features are well known in the art, these structures will not be discussed or illustrated in detail herein. Rather, it will be apparent to those skilled in the art from this disclosure that the components can be any type of structure and/or programming that can be used to carry out the present invention.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, compounds, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle HVAC noise control system. Accordingly, these terms, as utilized to describe the present invention should be interpreted relative to a vehicle equipped with the vehicle HVAC noise control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle HVAC noise control system, comprising:

an air handler connected to a passenger compartment within a vehicle;

a blower operably connected to the air handler to provide a plurality of airflow rates for air flowing into the passenger compartment;

an audio event device configured to electronically produce an audio event to the passenger compartment, where the audio event device consists of one or more of the following group of devices: *a hands-free communication device that wirelessly communicates with* a mobile communication device, *and* a navigation system [and a window sensor] *that includes a global positioning system that provides mapping, positioning and audible navigation instruction outputs*; [and]

a controller operatively connected to the blower and the audio event device, the controller controlling operation of the blower initially at an operating airflow rate and in response to a signal from the audio event device indicating that [the audio event device will subsequently produce] the audio event *is about to occur* the controller switches the blower to a noise reducing airflow rate, with the audio event occurring thereafter, *and while the controller controls the blower to operate at the noise reducing airflow rate, the controller further controls a display to produce an indication that the blower is operating at the noise reducing airflow rate, and* where the signal consists of one or more of the following:

an indication [of] *from the hands-free communication device that* an incoming communication is being received by the mobile communication device *with the audio event device being the hands-free communication device wirelessly connected to the mobile communication device*; *and* an indication [of] that *the global positioning system of* the navigation [device] *system* is about to issue *an* audible navigation instruction output[;

an indication that the window sensor has detected that a window of the passenger compartment is being opened; and an indication that an audio event device within the vehicle is about to produce an audio output that is intended to assist the vehicle operator or passenger] *with the audio event device being the navigation system; and*

*a microphone configured to receive audible input, and the controller is operatively coupled to the air handler and controls the air handler to selectively direct the air away from the microphone in response to audible inputs being provided to the microphone*.

2. The vehicle HVAC noise control system according to claim 1, wherein

*the audio event device is* the navigation system [sends] *and is configured to send* the signal to the controller [at a time interval] before producing the audible navigation instruction output.

3. The vehicle HVAC noise control system according to claim 1, [further comprising:] *wherein*

*the audio event device is the hands-free communication device wirelessly connected to the mobile communication device, the hands-free communication device being connected to* a voice recognition system that performs a voice recognition interaction.

4. The vehicle HVAC noise control system according to claim 3, wherein upon receiving an input from a manual voice recognition control, the voice recognition system sends a voice recognition signal to the controller [at a time interval prior to] *before* performing the voice recognition interaction.

5. The vehicle HVAC noise control system according to claim [1] *17*, wherein the window sensor is connected to an electric window system including a window control [and a movable window panel], the [movable] window [panel moving] *being movable* from a closed orientation to an open orientation upon receiving an input from the window control [as the audio event].

[6. The vehicle HVAC noise control system according to claim 5, further comprising:

a speed sensor that detects speed of a vehicle that includes the passenger compartment with the movable window panel, and the window sensor detecting the orientation of the movable window panel, and the signal from the audio event device includes a first signal and a second signal, the first signal being sent by the window sensor detecting the movable window panel is in a position other than the fully closed orientation and the second signal being sent by the speed sensor detecting that the vehicle is not in motion.]

[7. The vehicle HVAC noise control system according to claim 5, wherein the electric window system sends the signal to the controller upon receiving the input from the window control.]

[8. The vehicle HVAC noise control system according to claim 1, wherein the window sensor is connected to a movable window panel movable between a fully closed orientation and a fully open orientation, and the audio event device includes the window sensor detecting the orientation of the movable window panel, the window sensor sending the signal to the controller when the movable window panel is detected to be in the fully opened orientation.]

[9. The vehicle HVAC noise control system according to claim 1, wherein the audio event device is configured to send the signal to the controller at a predetermined time interval prior to the audio event being produced.]

[10. The vehicle HVAC noise control system according to claim 1, wherein the controller controls operation of the blower to switch from operating at the noise reducing airflow rate to the operating airflow rate upon conclusion of the audio event.]

11. The vehicle HVAC noise control system according to claim [10] *1*, wherein the controller [delays switching from operating] *operates the blower* at the noise reducing airflow rate [to the operating airflow rate] for a predetermined time interval after [conclusion of the audio event] *switching the*

*speed of the blower from the operating airflow rate to the noise reducing air flow rate.*

[12. The vehicle HVAC noise control system according to claim 1, wherein while the controller is controlling the blower to operate at the noise reducing airflow rate, the controller further controls a display to produce an indication that the blower is operating at the noise reducing airflow rate.]

[13. The vehicle HVAC noise control system according to claim 1, further comprising a microphone configured to receive audible input, and the controller is operatively coupled to the air handler and controls the air handler to selectively direct the air away from the microphone in response to audible inputs being provided to the microphone.]

14. The vehicle HVAC noise control system according to claim 1, wherein the air handler includes a first air outlet *with a first door*, a second air outlet *with a second door*, and a [movable blend] *third air outlet with a third* door [for selectively directing airflow from the blower through the first air outlet and the second air outlet], and the controller controls the [movable blend door] *the first, second and third doors* to direct the airflow entirely through the second *and third* air [outlet] *outlets* in response to the signal.

15. The vehicle HVAC noise control system according to claim 1, further comprising a temperature control for setting a desired temperature of the passenger compartment; and a temperature sensor for detecting the current temperature of the passenger compartment;

wherein the controller is operatively coupled to the temperature control and the temperature sensor, determines a temperature difference between the desired temperature and the current temperature, and alters *a position of a mixing door within the air handler in order to achieve* the desired temperature in accordance with the temperature difference while controlling the blower to operate at the noise reducing airflow rate.

16. The vehicle HVAC noise control system according to claim 1, further comprising an audio speaker configured to produce an audible output [in response to the audio event device producing the audio event].

*17. The vehicle HVAC noise control system according to claim 1, wherein*

*the audio event device is the navigation system which is connected to a voice recognition system that performs a voice recognition interaction.*

*18. A vehicle HVAC noise control system, comprising:*

*an air handler connected to a passenger compartment within a vehicle;*

*a speed sensor that detects the speed of the vehicle;*

*a blower operably connected to the air handler to provide a plurality of airflow rates for air flowing into the passenger compartment;*

*a window having a window sensor that detects whether the window is partially open or fully open; and*

*a controller operatively connected to the blower, the speed sensor and the window sensor of the window, such that the controller controls operation of the blower initially at an operating airflow rate and switches the blower to a noise reducing airflow rate in response to receiving a signal from the window sensor of the window indicating that the window is partially open or fully open and receiving a signal from the speed sensor that the vehicle speed is less than five miles per hour, wherein the controller assumes an audio event is about to occur based on the signals from the window sensor and the speed sensor with the audio event occurring thereafter, and while the controller controls the blower to operate at the noise reducing airflow rate, the controller further controls a display within the passenger compartment to produce an indication that the blower is operating at the noise reducing airflow rate.*

*19. The vehicle HVAC noise control system according to claim 18, wherein*

*the controller controls operation of the blower to switch from operating at the noise reducing airflow rate after a predetermined time interval to a variable HVAC blower speed determined by the controller based on the difference between a desired passenger compartment temperature and the current temperature of the passenger compartment being greater than a predetermined amount.*

* * * * *